United States Patent
Zhan et al.

(10) Patent No.: US 11,776,301 B2
(45) Date of Patent: Oct. 3, 2023

(54) FINGERPRINT DETECTION APPARATUS AND ELECTRONIC DEVICE

(71) Applicant: SHENZHEN GOODIX TECHNOLOGY CO., LTD., Shenzhen (CN)

(72) Inventors: Chang Zhan, Shenzhen (CN); Liang Li, Shenzhen (CN); Peng Jiang, Shenzhen (CN); Ming Ma, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/646,645

(22) Filed: Dec. 30, 2021

(65) Prior Publication Data

US 2022/0122374 A1    Apr. 21, 2022

Related U.S. Application Data

(63) Continuation of application No. PCT/CN2019/099135, filed on Aug. 2, 2019.

(51) Int. Cl.
*G06V 40/13* (2022.01)
*G06V 10/80* (2022.01)
*G02B 3/00* (2006.01)

(52) U.S. Cl.
CPC .......... *G06V 40/1318* (2022.01); *G06V 10/80* (2022.01); *G02B 3/0056* (2013.01)

(58) Field of Classification Search
None
See application file for complete search history.

(56) References Cited

U.S. PATENT DOCUMENTS

| | | |
|---|---|---|
| 10,216,975 B1 | 2/2019 | He et al. |
| 10,275,630 B2 | 4/2019 | Chung et al. |
| 10,303,921 B1 | 5/2019 | He et al. |

(Continued)

FOREIGN PATENT DOCUMENTS

| | | |
|---|---|---|
| CN | 104318205 A | 1/2015 |
| CN | 104460115 A | 3/2015 |

(Continued)

OTHER PUBLICATIONS

Jie Tan, "Peptide fingerprint detection and latent fingerprint visualization using porous silicon," Doctoral dissertation, Aug. 15, 2016, pp. 1-152, Zhejiang University, Zhejiang.

(Continued)

*Primary Examiner* — Joseph R Haley

(57) ABSTRACT

A fingerprint detection apparatus and an electronic device are provided. The fingerprint detection apparatus is applied under a display screen to implement under-screen optical fingerprint identification, including: a fingerprint sensor; the fingerprint sensor includes: N groups of sub-pixels, where N is a positive integer greater than 1; and different groups of sub-pixels in the N groups of sub-pixels respectively receive light signals with different characteristics in light signals returned by reflection or scattering via a finger, and light signals received by each group of sub-pixels in the N groups of sub-pixels are used to form one pixel in a fingerprint image of the finger.

19 Claims, 9 Drawing Sheets

(56) References Cited

U.S. PATENT DOCUMENTS

| | | |
|---|---|---|
| 10,360,432 B1 | 7/2019 | He et al. |
| 10,429,567 B2 | 10/2019 | Wan et al. |
| 10,551,310 B2 | 2/2020 | Wu et al. |
| 2008/0205711 A1 | 8/2008 | Kishigami et al. |
| 2013/0004030 A1 | 1/2013 | Saxena |
| 2014/0354597 A1 | 12/2014 | Kitchens, II |
| 2014/0354608 A1 | 12/2014 | Kitchens, II |
| 2014/0354823 A1 | 12/2014 | Kitchens, II |
| 2014/0354905 A1 | 12/2014 | Kitchens, II |
| 2014/0355846 A1 | 12/2014 | Won |
| 2015/0227773 A1 | 8/2015 | Miesak |
| 2016/0092717 A1 | 3/2016 | Ling |
| 2017/0124370 A1 | 5/2017 | He |
| 2017/0199610 A1 | 7/2017 | Kitchens, II |
| 2017/0220838 A1 | 8/2017 | He et al. |
| 2017/0270342 A1 | 9/2017 | He et al. |
| 2017/3063794 | 12/2017 | Wenqiang et al. |
| 2018/0040675 A1 | 2/2018 | Zeng et al. |
| 2018/0239941 A1 | 8/2018 | Mackey et al. |
| 2018/0301494 A1 | 10/2018 | Park et al. |
| 2018/0366593 A1 | 12/2018 | Huang et al. |
| 2019/0065717 A1 | 2/2019 | Won et al. |
| 2019/0095677 A1 | 3/2019 | Chung et al. |
| 2019/0120763 A1 | 4/2019 | Wu et al. |
| 2019/0180071 A1 | 6/2019 | Kim |
| 2019/0266376 A1 | 8/2019 | He et al. |
| 2019/0348457 A1 | 11/2019 | Park et al. |
| 2019/0362120 A1 | 11/2019 | Yeke Yazdandoost et al. |
| 2020/0035730 A1 | 1/2020 | Tanaka |
| 2020/0074138 A1 | 3/2020 | Sun et al. |
| 2020/0089928 A1 | 3/2020 | Long |
| 2020/0176499 A1 | 6/2020 | Park et al. |
| 2020/0234026 A1 | 7/2020 | Du |
| 2020/2027459 | 7/2020 | Jonghoon et al. |
| 2020/0292741 A1* | 9/2020 | Rhee ............ G02B 5/0294 |
| 2020/0293738 A1 | 9/2020 | Zhang et al. |
| 2020/0327296 A1 | 10/2020 | Wu et al. |
| 2020/0380237 A1 | 12/2020 | Nilsson et al. |

FOREIGN PATENT DOCUMENTS

| | | |
|---|---|---|
| CN | 104978555 A | 10/2015 |
| CN | 107122742 A | 9/2017 |
| CN | 107169471 A | 9/2017 |
| CN | 107358216 A | 11/2017 |
| CN | 109196524 A | 1/2018 |
| CN | 107820617 A | 3/2018 |
| CN | 107995972 A | 5/2018 |
| CN | 108399392 A | 8/2018 |
| CN | 108460349 A | 8/2018 |
| CN | 108537090 A | 9/2018 |
| CN | 207851850 U | 9/2018 |
| CN | 109074474 A | 12/2018 |
| CN | 109074492 A | 12/2018 |
| CN | 109154961 A | 1/2019 |
| CN | 109313704 A | 2/2019 |
| CN | 109426305 A | 3/2019 |
| CN | 109496313 A | 3/2019 |
| CN | 109508577 A | 3/2019 |
| CN | 109508606 A | 3/2019 |
| CN | 109716350 A | 5/2019 |
| CN | 109740514 A | 5/2019 |
| CN | 208848221 U | 5/2019 |
| CN | 109844766 A | 6/2019 |
| CN | 109844776 A | 6/2019 |
| CN | 109858465 A | 6/2019 |
| CN | 109863506 A | 6/2019 |
| CN | 109983471 A | 7/2019 |
| CN | 109983472 A | 7/2019 |
| CN | 209168144 U | 7/2019 |
| CN | 210052176 U | 2/2020 |
| CN | 210605739 U | 5/2020 |
| CN | 210864747 U | 6/2020 |
| EP | 3447685 A | 2/2019 |
| JP | 2010020237 A | 1/2010 |
| KR | 101948870 B1 | 2/2019 |
| KR | 20190023937 A | 3/2019 |
| WO | WO2018180569 A1 | 10/2018 |
| WO | 2019066414 A | 4/2019 |

OTHER PUBLICATIONS

Feng Guo-Song, "The research of fingerprint recognition arithmetic and hardware realization," Doctoral dissertation, China Academic Journal Electronic Publishing House, Jun. 15, 2013, pp. 1-67, PLA University of Information Engineering.

S. Prabhakar et al., "Biometric Recognition: Sensor characteristics and Image Quality," IEEE Instrumentation & Measurement Magazine, Jun. 30, 2011, pp. 10-16, vol. 14(3).

An-Thung Cho et al., "Nano-Si Optical Pixel-Sensor Array using TFT Technology as Image-Scan/Fingerprint Panel," SID Symposium Digest of Technical Papers, Jul. 1, 2013, pp. 1066-1069, vol. 44(1).

Yohan Lee et al., "Metamaterials and Metasurfaces for Sensor Applications. Sensors (Basel)", Jul. 27, 2017, 17(8):1726.

Shi, Boya et al., "Identifying artificial fingerprint by using optical coherence tomography", Journal of Optoelectronics Laser, Dec. 2013, vol. 24, No. 12, pp. 2404-2408.

Zijuan et al. "Optical system design of fingerprint and finger vein images compound acquisition", Journal of Applied Optics; Sep. 2017; pp. 770-776; vol. 38 No. 5.

* cited by examiner

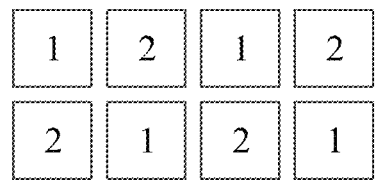 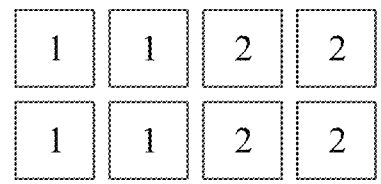
FIG. 6a  FIG. 6b
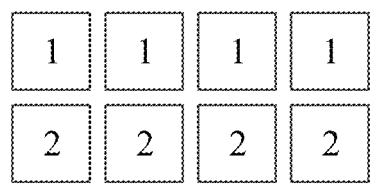 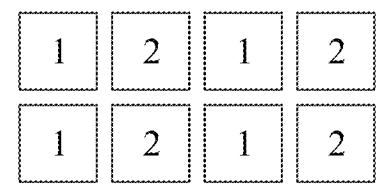
FIG. 6c  FIG. 6d
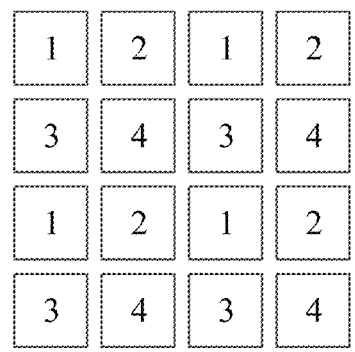
FIG. 7a
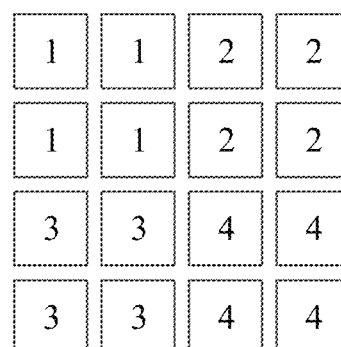
FIG. 7b

FINGERPRINT DETECTION APPARATUS AND ELECTRONIC DEVICE

CROSS-REFERENCE TO RELATED APPLICATIONS

This application is a continuation of International Application No. PCT/CN2019/099135, filed on Aug. 2, 2019, the disclosure of which is hereby incorporated by reference in its entirety.

TECHNICAL FIELD

The present application relates to the field of fingerprint detection, and more particularly, to a fingerprint detection apparatus and an electronic device.

BACKGROUND

In a fingerprint detection apparatus, a fingerprint image sensor, or a fingerprint sensor for short, is usually used to convert collected fingerprint light signals into fingerprint image electrical signals. The fingerprint sensor mainly includes a pixel array circuit and a signal processing circuit, where the pixel array circuit includes a plurality of pixel units, and each pixel unit correspondingly outputs one pixel value of an image. When one pixel unit fails, a corresponding pixel value in the image is not output, which affects image quality. Moreover, the fingerprint sensor can only process and obtain one fingerprint image, which cannot meet requirements of different fingerprint images in different scenes, and affects performance of the fingerprint detection apparatus.

Therefore, how to improve quality of fingerprint images to meet requirements of different scenes and improve performance of a fingerprint detection apparatus and its fingerprint sensor is a problem urgently to be solved.

SUMMARY

Embodiments of the present application provide a fingerprint detection apparatus and an electronic device, which could meet requirements of different images in different scenes, and improve performance of the fingerprint detection apparatus and its fingerprint sensor.

In a first aspect, a fingerprint detection apparatus is provided, where the fingerprint detection apparatus is applied under a display screen to implement under-screen optical fingerprint identification, and includes: a fingerprint sensor;

the fingerprint sensor includes: N groups of sub-pixels, where N is a positive integer greater than 1; and different groups of sub-pixels in the N groups of sub-pixels respectively receive light signals with different characteristics in light signals returned by reflection or scattering via a finger, and light signals received by each group of sub-pixels in the N groups of sub-pixels are used to form one pixel in a fingerprint image of the finger.

In a technical solution of the present application, by collecting light signals with different characteristics by reflection and scattering via a finger using N groups of sub-pixels in a fingerprint senor, N kinds of corresponding fingerprint image signals can be obtained, thereby meeting requirements of different scenes and improving performance of a fingerprint sensor and a fingerprint detection apparatus.

In a possible implementation manner, the light signals with different characteristics include: light signals in different directions.

In a possible implementation manner, the fingerprint sensor includes: M*N groups of sub-pixels, where M is a positive integer; and light signals received by the N groups of sub-pixels are used to form N fingerprint images of the finger, and each of the N fingerprint images of the finger has M pixels.

In a possible implementation manner, each group of sub-pixels in the N groups of sub-pixels includes a plurality of sub-pixels, and a sum of a plurality of light signals received by the plurality of sub-pixels is used to form one pixel in the fingerprint image of the finger.

In a possible implementation manner, the number of sub-pixels in each group of sub-pixels in the N groups of sub-pixels is equal.

In a possible implementation manner, the N groups of sub-pixels include a first group of sub-pixels, a plurality of first sub-pixels in the first group of sub-pixels are not adjacent to each other, and the plurality of first sub-pixels in the first group of sub-pixels are adjacent to other sub-pixels in the N groups of sub-pixels other than the first group of sub-pixels.

In a possible implementation manner, the N groups of sub-pixels include a first group of sub-pixels, and a plurality of first sub-pixels in the first group of sub-pixels are adjacent to each other.

In a possible implementation manner, each group of sub-pixels in the N groups of sub-pixels is arranged in the same manner in the N groups of sub-pixels.

In a possible implementation manner, each sub-pixel in the N groups of sub-pixels has the same shape and size, and is arranged in an array.

In a possible implementation manner, N=4.

In a possible implementation manner, each group of sub-pixels in the N groups of sub-pixels includes K sub-pixels, where K is an integer greater than 1, and the fingerprint detection apparatus further includes: a processing unit;

the K sub-pixels are configured to convert received light signals into K electrical signals; and the processing unit is configured to sum the K electrical signals to obtain one pixel in the fingerprint image of the finger.

In a possible implementation manner, the processing unit includes N sub-processing units, and one of the N sub-processing units is configured to sum one group of sub-pixels in the N groups of sub-pixels.

In a possible implementation manner, the processing unit includes a first sub-processing unit, the N groups of sub-pixels include a first group of sub-pixels, and the first sub-processing unit is connected to K sub-pixels in the first group of sub-pixels through K signal lines.

In a possible implementation manner, the first sub-processing unit is configured to receive K first electrical signals of the K sub-pixels in the first group of sub-pixels at the same time, and perform a summing calculation on the K first electrical signals.

In a second aspect, an electronic device is provided, including a display screen and the fingerprint detection apparatus in the first aspect or any one of possible implementation manners of the first aspect, where the fingerprint detection apparatus is disposed under the display screen.

BRIEF DESCRIPTION OF DRAWINGS

FIG. 6a to FIG. 6d are schematic diagrams of multiple sub-pixel arrangements according to an embodiment of the present application.

FIG. 7a to FIG. 7c are schematic diagrams of multiple sub-pixel arrangements according to another embodiment of the present application.

DESCRIPTION OF EMBODIMENTS

Technical solutions in embodiments of the present application will be described hereinafter with reference to accompanying drawings.

The technical solutions of the embodiments of the present application may be applied to various fingerprint sensors, such as a fingerprint sensor in an optical fingerprint system, including but not limited to an optical fingerprint identification system and a product based on optical fingerprint imaging. The embodiments of the present application are described only by an example of an optical fingerprint system, which should not constitute any limitation to the embodiments of the present application, and the embodiments of the present application are also applicable to other systems using an optical imaging technology or the like.

As a common application scene, a fingerprint sensor provided in the embodiments of the present application may be applied to a smart phone, a camera, a tablet computer and another mobile terminal having an imaging function or another electronic device.

More specifically, in the above electronic device, a fingerprint sensor may be specifically a fingerprint detection apparatus, which may be disposed in a partial region or an entire region under a display screen, thereby forming an under-screen optical fingerprint system. Alternatively, the fingerprint detection apparatus may be partially or entirely integrated into the interior of the display screen of the electronic device, thereby forming an in-screen optical fingerprint system.

Figure 1:
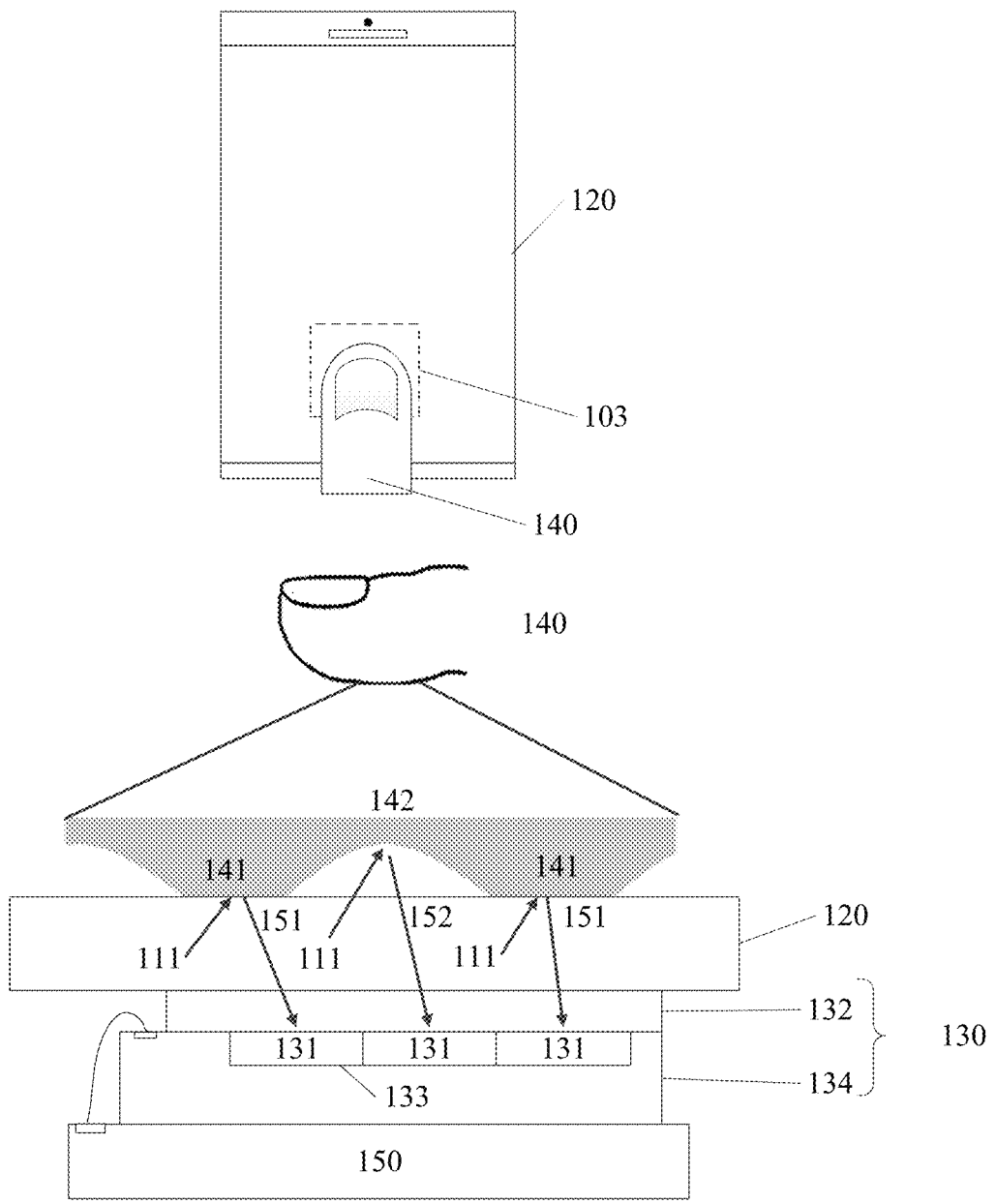
FIG. 1 is a schematic structural diagram of an electronic device applicable to an embodiment of the present application.

FIG. 1 is a schematic structural diagram of an electronic device applicable to an embodiment of the present application. An electronic device 10 includes a display screen 120 and a fingerprint detection apparatus 130, where the fingerprint detection apparatus 130 is disposed in a partial region under the display screen 120. The fingerprint detection apparatus 130 includes an optical fingerprint sensor that includes a sensing array 133 having a plurality of optical sensing units 131, and a region where the sensing array 133 is located or a sensing region of the sensing array 133 is a fingerprint detecting region 103 of the fingerprint detection apparatus 130. As shown in FIG. 1, the fingerprint detecting region 103 is located in a display region of the display screen 120. In an alternative embodiment, the fingerprint detection apparatus 130 may also be disposed at another position, such as a side of the display screen 120 or a non-light-transmitting region of an edge of the electronic device 10, and a light signal from at least part of the display region of the display screen 120 is directed to the fingerprint detection apparatus 130 through a light path design, so that the fingerprint detecting region 103 is actually located in the display region of the display screen 120.

It should be understood that an area of the fingerprint detecting region 103 may be different from an area of the sensing array of the fingerprint detection apparatus 130. For example, the area of the fingerprint detecting region 103 of the fingerprint detection apparatus 130 may be larger than the area of the sensing array of the fingerprint detection apparatus 130 through, for example, a lens imaging light path design, a reflective folding light path design or other light path designs such as light convergence or reflection. In other alternative implementation manners, if a light path is directed by means of, for example, light collimation, the area of the fingerprint detecting region 103 of the fingerprint detection apparatus 130 may be designed to be substantially identical with the area of the sensing array of the fingerprint detection apparatus 130.

As an optional implementation manner, as shown in FIG. 1, the fingerprint detection apparatus 130 includes a light detecting portion 134 and an optical component 132. The light detecting portion 134 includes the sensing array, a readout circuit and other auxiliary circuits electrically connected to the sensing array, and may be fabricated on a die by a semiconductor process, such as an optical imaging chip or an optical fingerprint sensor. The sensing array is specifically a photo detector array including a plurality of photo detectors distributed in an array. The photo detectors may be used as the optical sensing units as described above. The optical component 132 may be disposed above the sensing array of the light detecting portion 134, and may specifically include a filter layer, a light directing layer or a light path directing structure, and other optical elements. The filter layer may be configured to filter out ambient light penetrating a finger, and the light directing layer or light path directing structure is mainly configured to direct reflected light reflected from a finger surface to the sensing array for optical detection.

It should also be understood that in the embodiments of the present application, the sensing array in the fingerprint detection apparatus may also be referred to as a pixel array, and the optical sensing units or sensing units in the sensing array may also be referred to as pixel units.

It should be noted that the fingerprint detection apparatus in the embodiments of the present application may also be referred to as an optical fingerprint identification module, an optical fingerprint apparatus, a fingerprint identification module, a fingerprint module, a fingerprint capturing apparatus, or the like, and the foregoing terms may be replaced with each other.

Figure 2:
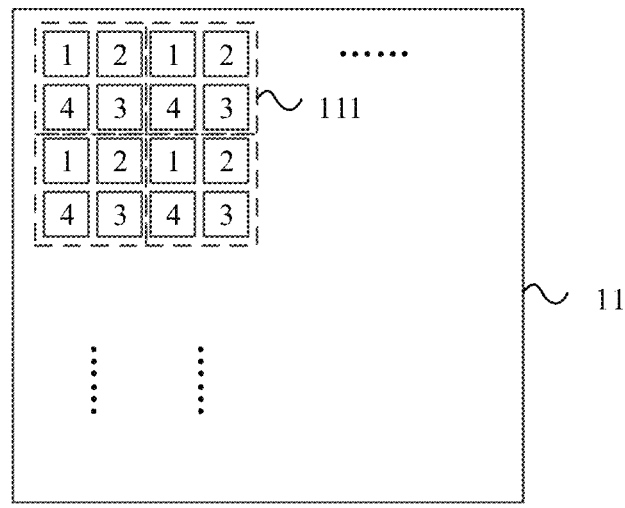
FIG. 2 is a schematic diagram of a pixel arrangement of a pixel array circuit according to an embodiment of the present application.
Figure 3:
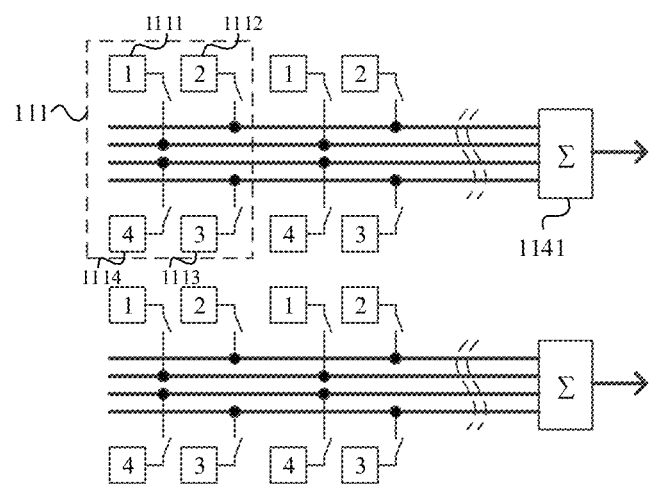
FIG. 3 is a schematic diagram of circuit connections of a pixel array circuit according to an embodiment of the present application.
Figure 4:
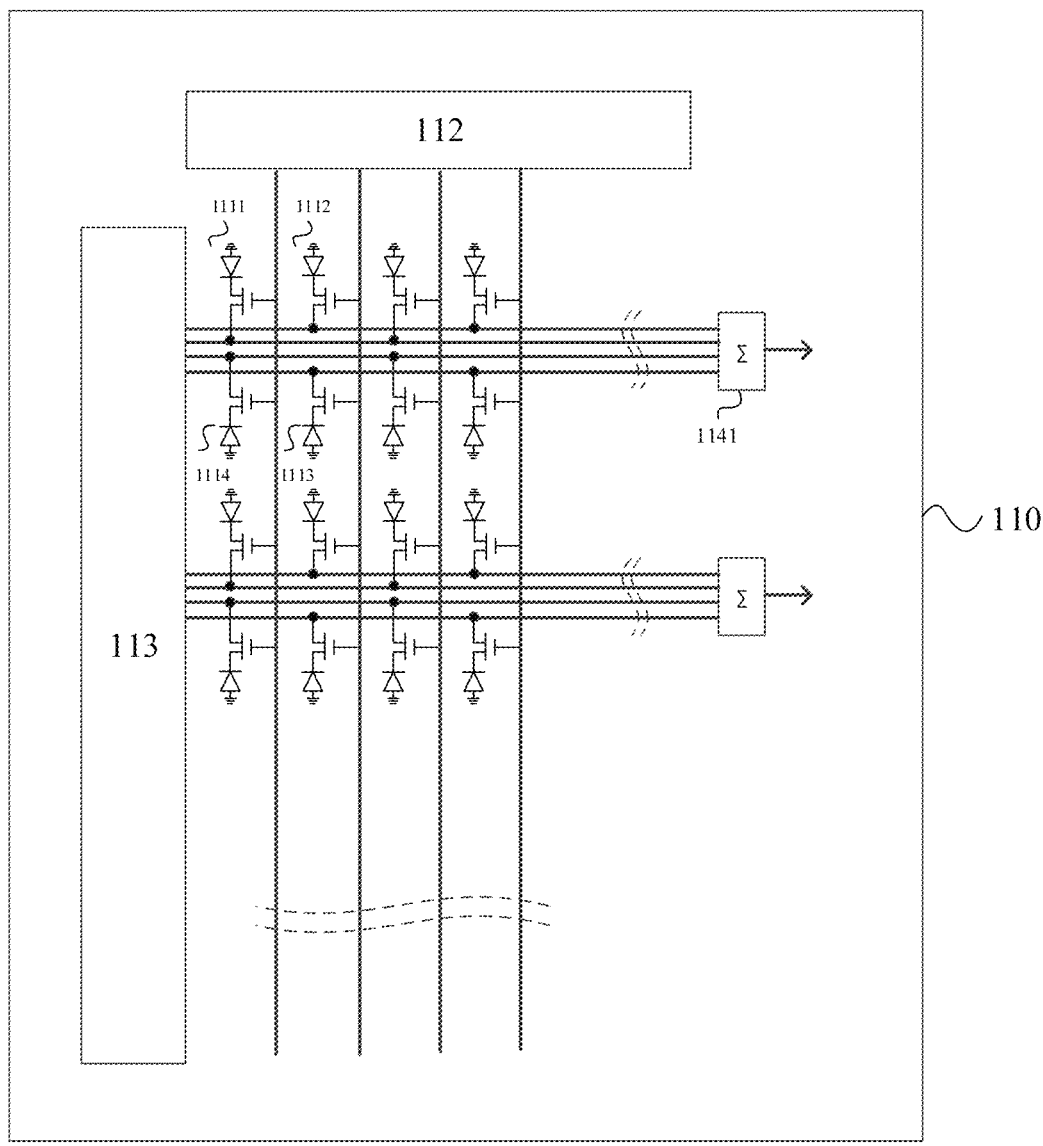
FIG. 4 is a schematic diagram of circuit connections of another pixel array circuit according to an embodiment of the present application.

FIG. 2 to FIG. 4 show schematic diagrams of a pixel array circuit 11. The pixel array circuit may be the sensing array in the fingerprint detection apparatus in FIG. 1.

FIG. 2 is a schematic diagram of a pixel arrangement of the pixel array circuit 11. As shown in FIG. 2, the pixel array circuit 11 includes an array structure composed of a plurality of pixel units 111, one pixel unit is configured to receive a light signal and output one electrical signal value, and the electrical signal value corresponds to one pixel point value in a fingerprint image. One pixel unit includes a plurality of sub-pixels (sub-pixel can also be called Cell), and an electrical signal value of one pixel unit is a sum of electrical signals of the plurality of sub-pixels.

Optionally, as shown in FIG. 2 to FIG. 4, one pixel unit 111 includes four adjacent sub-pixels, which are a first sub-pixel, a second sub-pixel, a third sub-pixel and a fourth sub-pixel, respectively. In FIG. 2 and FIG. 3, the first sub-pixel is identified as "1", the second sub-pixel is identified as "2", the third sub-pixel is identified as "3", and the fourth sub-pixel is identified as "4".

Specifically, as shown in FIG. 3, each sub-pixel is connected to a signal line through a switch for data output, and values of four sub-pixels are summed by a processing unit and output as a pixel value of one pixel unit. Further, by controlling different sub-pixels to be turned on at different times, sub-pixels in different pixel units are summed sequentially, and pixel values of different pixel units are output sequentially.

It should be understood that one pixel unit 111 is configured to image one target region in a target object to be imaged. Therefore, four sub-pixels in one pixel unit 111 all receive light signals of the same target region of a finger, and a sum of electrical signals generated by the four sub-pixels corresponds to a pixel value of a first target region in a fingerprint image of the finger.

It should also be understood that in the embodiments of the present application, one pixel unit may include two, three, or any other number of sub-pixels, which is not limited in the embodiments of the present application.

Optionally, as shown in FIG. 4, in a possible implementation manner, one sub-pixel may be composed of a photodiode, a field effect transistor, and the like, where the photodiode is configured to receive a light signal and convert it into an electrical signal, and the field effect transistor is configured to control a switch of the photodiode.

As shown in FIG. 4, the pixel array circuit 11 further includes: a first driving unit 112 and a second driving unit 113. The first driving unit 112 is connected to each column of sub-pixels through a plurality of signal lines, specifically, to gates of field effect transistors in each column of sub-pixels, and drives photodiodes by turning on field effect switch transistors to receive light signals and convert them into electrical signals. Optionally, the first driving unit 112 sequentially drives each column of sub-pixels in M columns of sub-pixels in the pixel array circuit 11 through square wave driving signals.

The second driving unit 113 is connected to each row of sub-pixels through a plurality of signal lines, specifically, to sources of field effect transistors in each row of sub-pixels for driving transmission of electrical signals of each row of sub-pixels. Optionally, the second driving unit 113 may sequentially drive each row of sub-pixels in N rows of sub-pixels in the pixel array circuit 11 through square wave driving signals.

It should be understood that the first driving unit 112 may be connected to each row of sub-pixels through signal lines to control switches of each row of sub-pixels. For example, the first driving unit is connected to gates of field effect transistors of each row of sub-pixels. Correspondingly, the second driving unit 113 may be connected to each column of sub-pixels through signal lines to control output of electrical signals of each column of sub-pixels. For example, the second driving unit is connected to sources of field effect transistors of each column of sub-pixels.

As shown in FIG. 3 and FIG. 4, the pixel array circuit 11 further includes: a plurality of processing units configured to sum electrical signal values of four sub-pixels in one pixel unit 111. For example, a first summing unit 1141 is one of the plurality of processing units, and the first summing unit 1141 is connected to four row signal lines to add electrical signal values of a first target sub-pixel 1111, a second target sub-pixel 1112, a third target sub-pixel 1113 and a fourth target sub-pixel 1114 in a first target pixel unit. Specifically, during a period of time t1, the first driving unit 112 drives the first column of sub-pixels and the second column of sub-pixels to operate. In this case, the first summing unit 1141 receives electrical signal values of the first target sub-pixel 1111 to the fourth target sub-pixel 1114 at the same time, adds the four received electrical signal values and outputs as an electrical signal value of the first target pixel unit.

It should be understood that in FIG. 4, the first summing unit 1141 may receive electrical signal values of four sub-pixels located in in the first row to the forth row and the third and fourth columns during a period of time t2, add the electrical signal values of the four sub-pixels and output. Therefore, during different periods of time, the first summing unit 1141 may receive electrical signal values of all sub-pixels in the first row to the forth row, sequentially add them to output to obtain pixel values of pixel units. Similarly, another summing unit is also connected to four rows of sub-pixels, sequentially output pixels values of pixel units corresponding to the four rows of sub-pixels.

In the above pixel array circuit, one pixel unit includes four adjacent sub-pixels, and electrical signal values of the four sub-pixels are added by a summing unit as an electrical signal value of the pixel unit. When any one or more of the four adjacent sub-pixels are damaged due to poor manufacturing processes, electrostatic effects or other problems, only if one of the four sub-pixels can be used normally, the signal value of the current pixel unit can be output based on the electrical signal value of the normal sub-pixel.

However, in this technical solution, four adjacent sub-pixels are processed as one pixel unit, and the four sub-pixels in all pixel units are of the same type. Therefore, only one type of image can be output, and different images cannot be output according to different requirements and scenes.

In the present application, it is proposed that a variety of sub-pixels can be used to receive light signals with different characteristics, multiple images can be output to adapt to different requirements and scenes, and the multiple images can be composited to improve imaging quality of the fingerprint sensor, which can reduce the size and thickness of the fingerprint detection apparatus while improving performance and reliability of the fingerprint sensor.

The fingerprint detection apparatus and its fingerprint sensor according to embodiments of the present application will be described below in detail with reference to FIG. 5 to FIG. 15.

It should be noted that in embodiments shown below, the same structures are denoted by the same reference signs for ease of understanding, and detailed description of the same structures is omitted for brevity.

It should be understood that the number and arrangements of sub-pixels and the like in the embodiments of the present application shown below are merely exemplarily illustrative and should not constitute any limitation to the present application.

Figure 5:
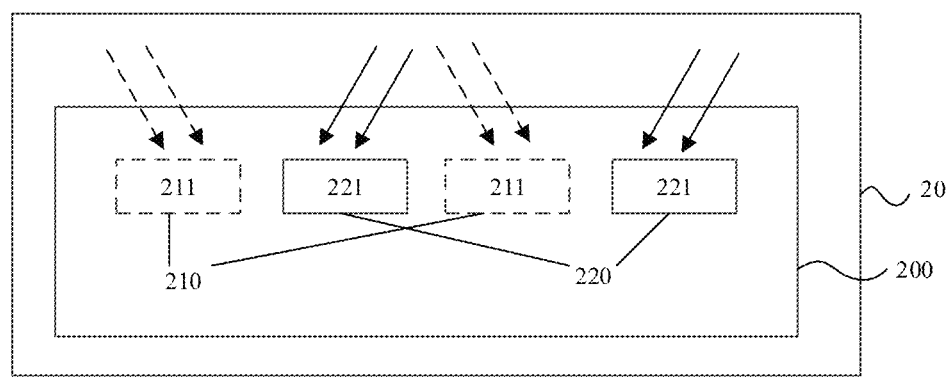
FIG. 5 is a schematic diagram of a fingerprint detection apparatus according to an embodiment of the present application.

FIG. 5 shows a schematic diagram of a fingerprint detection apparatus 20 according to an embodiment of the present application. The fingerprint detection apparatus 20 is applied under a display screen, and can implement an under-screen optical fingerprint identification function.

As shown in FIG. 5, the fingerprint detection apparatus 20 includes: a fingerprint sensor 200;

the fingerprint sensor 200 includes: N groups of sub-pixels, where N is a positive integer greater than 1; and different groups of sub-pixels in the N groups of sub-pixels respectively receive light signals with different characteristics in light signals returned by reflection or scattering via a finger, and light signals received by each group of sub-pixels in the N groups of sub-pixels are used to form one pixel in a fingerprint image of the finger.

For example, as shown in FIG. 5, the N groups of sub-pixels include a first group of sub-pixels 210 and a second group of sub-pixels 220. The first group of sub-pixels 210 includes at least one first sub-pixel 211, and the second group of sub-pixels 220 includes at least one second sub-pixel 221;

where the first sub-pixel 211 is configured to receive a first light signal by reflection or scattering via the finger, and the second sub-pixel 221 is configured to receive a second light signal by reflection or scattering via the finger. The first light signal and the second light signal have different characteristics.

Moreover, the first light signal received by the at least one first sub-pixel 211 in the first group of sub-pixels 210 is used to form one pixel value in the fingerprint image, and the second light signal received by the at least one second sub-pixel 221 in the second group of sub-pixels 220 is used to form one pixel value in the fingerprint image.

Specifically, the at least one first sub-pixel 211 receives the first light signal and converts the first light signal into at least one first electrical signal, and the at least one first electrical signal is used for processing to obtain one pixel value in the fingerprint image. The at least one second sub-pixel 221 receives the second light signal and converts the second light signal into at least one second electrical signal, and the at least one second electrical signal is also used for processing to obtain one pixel value in the fingerprint image.

In the embodiments of the present application, the light signals with different characteristics include light signals with different characterizes in at least one of a propagation direction, a wavelength and a polarization direction. That is, the first light signal and the second light signal may be light signals with different characteristics, such as different wave bands, different propagation directions, different polarization directions, or different intensities, which is not limited in the embodiments of the present application.

Optionally, the first light signal and the second light signal have different wavelengths. For example, the first light signal is red light, and the second light signal is blue light; or the first light signal is visible light, and the second light signal is infrared light, or the like.

Optionally, the first light signal and the second light signal have different directions. In other words, angles of incidence incident to the sub-pixels are different. For example, an included angle between the first light signal and a plane where the sub-pixel is located is 30°, and an included angle between the second light signal and a plane where the sub-pixel is located is 45°, or the like.

Optionally, the first light signal and the second light signal have different polarization directions. For example, the first light signal is a linearly polarized light signal passing through a linear polarizer of 0°, and the second light signal is a linearly polarized light signal passing through a linear polarizer of 90°.

Optionally, structures of the first sub-pixel 211 and the second sub-pixel 221 may be the same as or similar to the structure of the sub-pixel in FIG. 4, and may include one or more light-emitting diodes and switch transistors for controlling operation of the sub-pixels.

Optionally, in the embodiments of the present application, the number of sub-pixels in each group of sub-pixels in the N groups of sub-pixels is equal or unequal. For example, the number of sub-pixels in the first group of sub-pixels 210 and the number of sub-pixels in the second group of sub-pixels 220 are equal or unequal, which is not limited in the embodiments of the present application.

Optionally, the number of sub-pixels in each group of sub-pixels in the N groups of sub-pixels is equal.

Optionally, each group of sub-pixels in the N groups of sub-pixels includes a plurality of sub-pixels, and a sum of a plurality of light signals received by the plurality of sub-pixels is used to form one pixel in the fingerprint image of the finger.

For example, the first group of sub-pixels 210 may include two or more than two sub-pixels, and a sum of a plurality of first light signals received by the first group of sub-pixels 210 is used to form one pixel in the fingerprint image of the finger.

Specifically, a plurality of first sub-pixels 211 in the first group of sub-pixels 210 receive the first light signals and convert the first light signals into a plurality of electrical signals, and a sum of the plurality of electrical signals is used for processing to obtain one pixel value in the fingerprint image.

Optionally, the N groups of sub-pixels may be arranged according to a certain rule, for example, arranged regularly in an array, or arranged in a pyramid shape, or arranged in any other manner, which is not limited in the present application.

It should be understood that the shape of each sub-pixel in the N groups of sub-pixels may be quadrangular, hexagonal, or another shape, and the shape and size of each sub-pixel in the N groups of sub-pixels are the same or different, which is not limited in the embodiments of the present application.

It should also be understood that the first group of sub-pixels 210 and the second group of sub-pixels 220 in FIG. 5 are any two groups of sub-pixels in the N groups of sub-pixels. When N is greater than 2, characteristics of light signals received by any other group of sub-pixels in the N groups of sub-pixels are all different from those of the first light signal and the second light signal, and reference may be correspondingly made to the above related description and technical solution of the first group of sub-pixel 210 or second group of sub-pixel 220 for any other group of sub-pixels, which will not be repeated redundantly herein.

In the embodiments of the present application, by collecting N kinds of light signals with different characteristics by reflection and scattering via the finger using the N groups of sub-pixels, N kinds of corresponding fingerprint image signals can be obtained, thereby meeting requirements of different scenes. In addition, the N kinds of fingerprint image signals may be further fused and optimized to obtain an optimized new fingerprint image signal, which could improve quality of the fingerprint image and performance of the fingerprint sensor.

In addition, when the plurality of sub-pixels are configured to form one pixel value in the fingerprint image, any one of the plurality of sub-pixels is damaged, the other sub-pixels can operate and still form the pixel value. Therefore, reliability and a production yield of the fingerprint sensor can be improved while images with different characteristics are extracted.

Moreover, with the solution of the embodiment of the present application, the density of the plurality of sub-pixels can be improved in a case that it is ensured that two adjacent sub-pixels do not affect each other, thereby reducing the size of the fingerprint detection apparatus.

Particularly, when the N groups of sub-pixels can respectively receive oblique light signals in different directions, an amount of entering light received by the fingerprint identification apparatus may be improved first, and thus an exposure duration of time the pixel array may be reduced.

Secondly, fingerprint information of a dry finger may be detected by receiving the oblique light signals by the N groups of sub-pixels and using the oblique light signals. When contact between a fingerprint of the dry finger and an OLED screen is poor, contrast of a fingerprint image between a fingerprint ridge and a fingerprint valley in a vertical direction is poor, and the image is too blurred to distinguish the fingerprint lines. According to the present application, a fingerprint image of the dry finger can be detected better while normal finger fingerprints can be acquired better by allowing the sub-pixels to receive light signals in oblique directions. In a normal life scene, the finger is usually dry, the cuticle is uneven, and when the finger is pressed against the OLED screen, poor contact may occur in some regions of the finger. The occurrence of this case causes a bad effect of the current optical fingerprint solution on fingerprint identification for a dry hand, and the beneficial effect of the present application is to improve a fingerprint imaging effect of a dry hand and make a fingerprint image of the dry hand clear.

Third, the N groups of sub-pixels in the fingerprint sensor can also expand an angle of the field of view and the field of view of the N groups of sub-pixels in the fingerprint sensor by receiving the oblique light signals. For example, the field of view of the fingerprint detection apparatus can be expanded from 6*9 $mm^2$ to 7.5*10.5 $mm^2$, which further improves the fingerprint identification effect. In addition, when the N groups of sub-pixels receive the oblique light signals, a thickness of a light path design of the plurality of sub-pixels can be shortened, thereby reducing a thickness of the fingerprint detection apparatus effectively.

Optionally, the fingerprint sensor 200 includes: M*N groups of sub-pixels, where M is a positive integer, and light signals received by the N groups of sub-pixels are used to form N fingerprint images of the finger, and each of the N fingerprint images of the finger has M pixels.

Specifically, each group of sub-pixel in the N groups of sub-pixels outputs and obtains one pixel in the fingerprint image of the finger, and the N groups of sub-pixels are regarded as one set of pixels. When the fingerprint sensor includes M repeated sets of pixels, a first group of sub-pixels in N groups of sub-pixels in each set of pixels outputs one pixel value, and the M corresponding first groups of sub-pixels in the M sets of pixels output M pixel values to form one fingerprint image of the finger. It can be seen that a total of N fingerprint images of the finger can be output, and pixel values in each fingerprint image are all obtained by processing by sub-pixels receiving light signals with the same characteristic.

In this case, the N fingerprint images of the finger may be applied to different scenes to meet different requirements, or the N fingerprint images may be superimposed to obtain one fingerprint image with high resolution, and then fingerprint identification is performed based on this fingerprint image with high resolution, which could improve fingerprint identification performance. It should be understood that in the M sets of pixels, N groups of sub-pixels in different sets of pixels are arranged in the same or different manner, which is not limited in the embodiments of the present application.

Optionally, the M sets of pixels are arranged in an array, and N groups of sub-pixels in each set of pixels are arranged in the same manner.

Optionally, each group of sub-pixels in the N groups of sub-pixels includes a plurality of sub-pixels, and a sum of a plurality of light signals received by the plurality of sub-pixels is used to form one pixel in the fingerprint image of the finger.

Optionally, the N groups of sub-pixels are arranged in various manners. For example, a first group of sub-pixels is any group of sub-pixels in the N groups of sub-pixels.

In a possible implementation manner, a plurality of first sub-pixels in the first group of sub-pixels are not adjacent to each other, and the plurality of first sub-pixels in the first group of sub-pixels are adjacent to other sub-pixels in the N groups of sub-pixels other than the first group of sub-pixels.

In another possible implementation manner, a plurality of first sub-pixels in the first group of sub-pixels are adjacent to each other.

In a third possible implementation manner, some of a plurality of first sub-pixels in the first group of sub-pixels are adjacent to each other.

For example, the N groups of sub-pixels include a first group of sub-pixels 210 and a second group of sub-pixels 220. The first group of sub-pixels 210 includes four first sub-pixels 211, and the second group of sub-pixels 220 includes four second sub-pixels 221.

The positional relationship between the four first sub-pixels 211 and the four second sub-pixels 221 will be exemplarily illustrated below with reference to FIG. 6a to FIG. 6d. In FIG. 6a to FIG. 6d, the numbers of the first sub-pixels 221 and the second sub-pixels 221 are four, respectively, the first sub-pixels 211 are identified as "1", and the second sub-pixels 221 are identified as "2".

Optionally, as shown in FIG. 6a, the four first sub-pixels 211 are not adjacent to each other, the four second sub-pixels 221 are not adjacent to each other either, and the four first sub-pixels 211 and the four second sub-pixels 221 are arranged alternately.

Optionally, as shown in FIG. 6b and FIG. 6c, the four first sub-pixels 211 are adjacent to each other, and the four second sub-pixels 221 are also adjacent to each other.

Optionally, as shown in FIG. 6d, some of the four first sub-pixels 211 are adjacent to each other, and some of the four second sub-pixels 221 are also adjacent to each other.

For another example, the N groups of sub-pixels include a first group of sub-pixels 210, a second group of sub-pixels 220, a third group of sub-pixels 230 and a fourth group of sub-pixels 240. The first group of sub-pixels 210 includes four first sub-pixels 211, the second group of sub-pixels 220 includes four second sub-pixels 221, the third group of sub-pixels 230 includes four third sub-pixels 231, and the fourth group of sub-pixels 240 includes four fourth sub-pixels 241.

Figure 7C:
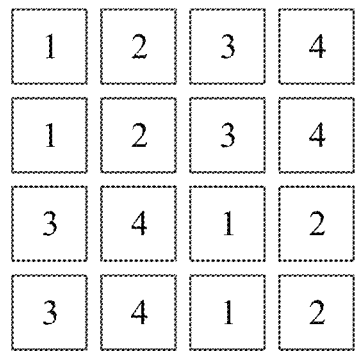

The positional relationship among four types of a plurality of sub-pixels will be exemplarily illustrated below with reference to FIG. 7a to FIG. 7c. In FIG. 7a to FIG. 7c, the first sub-pixels 211 are identified as "1", the second sub-pixels 221 are identified as "2", the third sub-pixels are identified as "3", and the fourth sub-pixels are identified as "4".

Optionally, as shown in FIG. 7a, the four first sub-pixels are not adjacent to each other, the four second sub-pixels are not adjacent to each other, the four third sub-pixels are not adjacent to each other and the four fourth sub-pixels are not adjacent to each other.

Optionally, as shown in FIG. 7b, the four first sub-pixels are adjacent to each other, the four second sub-pixels are adjacent to each other, the four third sub-pixels are adjacent to each other and the four fourth sub-pixels are adjacent to each other.

Optionally, as shown in FIG. 7c, some of the four first sub-pixels are adjacent to each other, some of the four second sub-pixels are adjacent to each other, some of the four third sub-pixels are adjacent to each other and some of the four fourth sub-pixels are adjacent to each other.

It should be understood that the above illustrations are only examples of positional relationships and arrangements of the four first sub-pixels, the four second sub-pixels, the four third sub-pixels and the four fourth sub-pixels, which is not limited in the embodiments of the present application.

Optionally, each group of sub-pixels in the N groups of sub-pixels is arranged in the same or different manner in the N groups of sub-pixels.

Optionally, each group of sub-pixels in the N groups of sub-pixels is arranged in the same manner in the N groups of sub-pixels.

For example, as shown in FIG. 6b, FIG. 6c and FIG. 6d, the relative positional relationship among the plurality of first sub-pixels 211 in the first group of sub-pixels 210 is the same as that among the plurality of second sub-pixels 221 in the second group of sub-pixels 220, and the first group of sub-pixels 210 and the second group of sub-pixels 220 are arranged in the same manner in the two groups of sub-pixels.

Moreover, in FIG. 7a and FIG. 7b, the relative positional relationship among the plurality of first sub-pixels 211 in the first group of sub-pixels 210, the relative positional relationship among the plurality of second sub-pixels 221 in the second group of sub-pixels 220, the relative positional relationship among the plurality of third sub-pixels 231 in the third group of sub-pixels 230 and the relative positional relationship among the plurality of fourth sub-pixels 241 in the fourth group of sub-pixels 240 are the same, and the first group of sub-pixels 210, the second group of sub-pixels 220, the third group of sub-pixels 230 and the fourth group of sub-pixels 240 are arranged in the same manner in the four groups of sub-pixels.

It should be understood that different groups of sub-pixels in the N groups of sub-pixels are configured to receive light signals with different characteristics, and the above illustrations are only examples of positional relationships and arrangements of multiple groups of sub-pixels, which is not limited in the embodiments of the present application.

Figure 8:
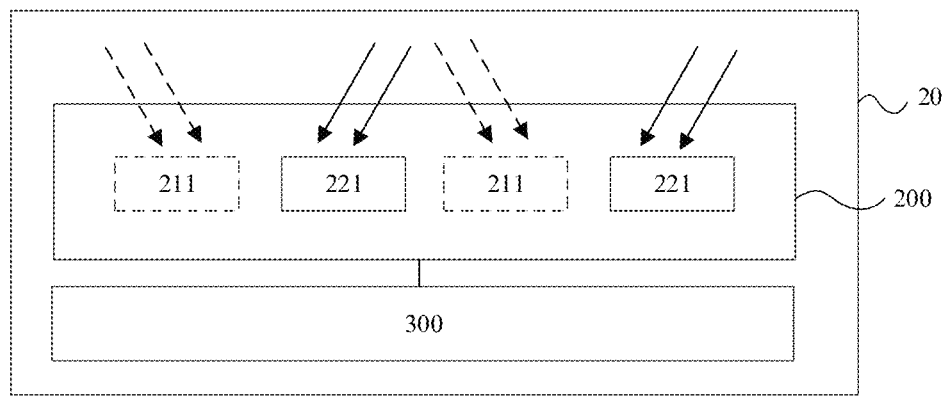
FIG. 8 is a schematic diagram of another fingerprint detection apparatus according to an embodiment of the present application.

Optionally, each group of sub-pixels in the N groups of sub-pixels includes K sub-pixels, where K is an integer greater than 1, and as shown in FIG. 8, the fingerprint detection apparatus 20 further includes: a processing unit 300;

the K sub-pixels are configured to convert received light signals into K electrical signals; and the processing unit is configured to sum the K electrical signals to obtain one pixel in the fingerprint image of the finger.

It should be understood that the processing unit 300 may be a processor in the fingerprint detection apparatus 20 or a processing circuit in the fingerprint sensor 200, each of which may be configured to perform a summing calculation on electrical signal values output by each group of sub-pixels in the N groups of sub-pixels, and process them to obtain one pixel value in the fingerprint image.

Optionally, in a possible implementation manner, the N groups of sub-pixels correspond to N sub-processing units, and one of the N sub-processing units is configured to sum one group of sub-pixels in the N groups of sub-pixels.

Figure 9:
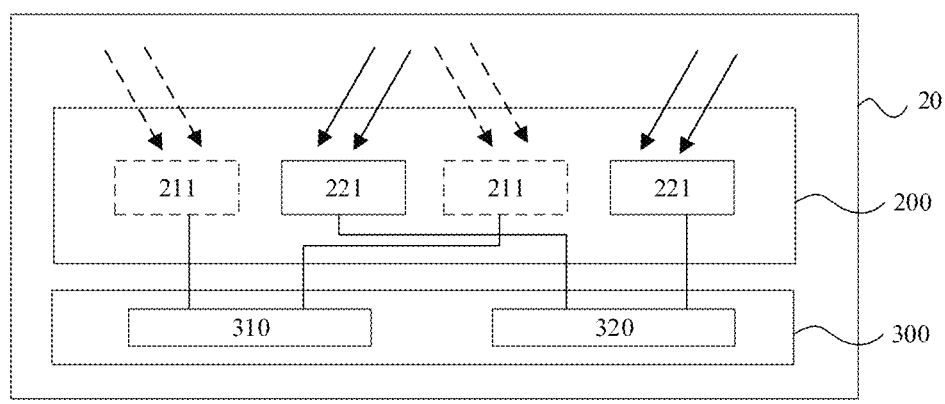
FIG. 9 is a schematic diagram of another fingerprint detection apparatus according to an embodiment of the present application.

For example, as shown in FIG. 9, the fingerprint sensor 200 includes a plurality of first sub-pixels 211 in a first group of sub-pixels 210, and a plurality of second sub-pixels 221 in a second group of sub-pixels 220. Correspondingly, the processing unit 300 includes a first sub-processing unit 310 and a second sub-processing unit 320. The first sub-processing unit 310 is configured to sum the first sub-pixels 211 in the first group of sub-pixels 210, and the second sub-processing unit 320 is configured to sum the second sub-pixels 221 in the second group of sub-pixels 220.

Optionally, the first sub-processing unit 310 may be connected to the plurality of first sub-pixels 211 and the second sub-processing unit 320 may be connected to the plurality of second sub-pixels 221 in different connection manners. An image processor transfers data at different speed in different connection manners.

Different connection manners of the first sub-processing unit 310 and the second sub-processing unit 320 to sub-pixels in the arrangement of the sub-pixels of FIG. 6a will be exemplarily illustrated below with reference to FIG. 10a to FIG. 10c.

Figure 10A:
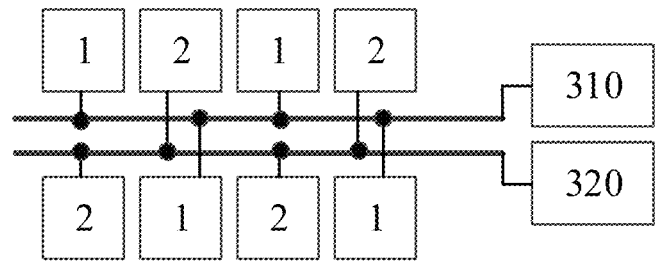
FIG. 10a to FIG. 10c are schematic diagrams of circuit connections of multiple pixel array circuits according to an embodiment of the present application.

As shown in FIG. 10a, the four first sub-pixels and the four second sub-pixels are connected to the first sub-processing unit 310 and the second sub-processing unit 320 through one signal line, respectively. In this case, the first column of sub-pixels are turned on at time t1, and the first sub-processing unit 310 and the second sub-processing unit 320 respectively receive the first electrical signal value; the second column of sub-pixels are turned on at time t2, and the first sub-processing unit 310 and the second sub-processing unit 320 respectively receive the second electrical signal value; and until proceeding to time t4 in sequence, the first sub-processing unit 310 and the second sub-processing unit 320 respectively receive four electrical signal values and sum the four electrical signal values.

Figure 10B:
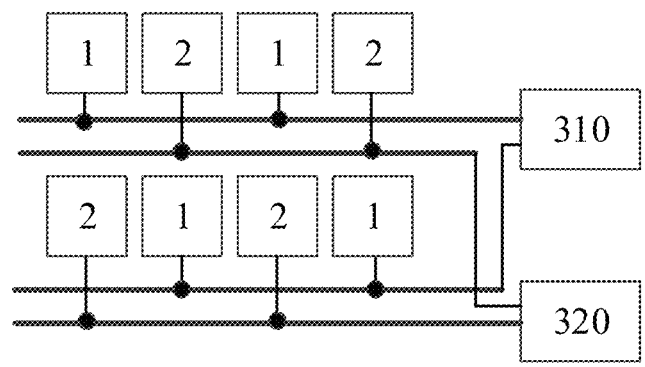

As shown in FIG. 10b, the four first sub-pixels and the four second sub-pixels are connected to the first sub-processing unit 310 and the second sub-processing unit 320 through two signal lines, respectively. In this case, the first column of sub-pixels and the second column of sub-pixels are turned on at time t1, and the first sub-processing unit 310 and the second sub-processing unit 320 respectively receive two electrical signal values; and the third column of sub-pixels and the fourth column of sub-pixels are turned on at time t2, and the first sub-processing unit 310 and the second sub-processing unit 320 respectively receive two electrical signal values again and sum the four electrical signal values received twice.

Figure 10C:
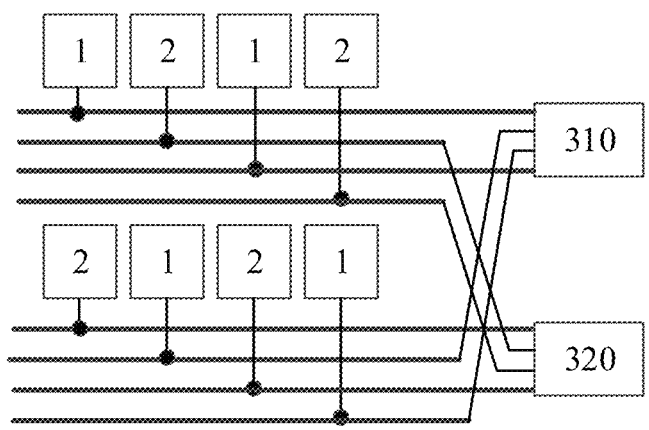

As shown in FIG. 10c, the four first sub-pixels and the four second sub-pixels are connected to the first sub-processing unit 310 and the second sub-processing unit 320 through four signal lines, respectively. In this case, the first column of sub-pixels, the second column of sub-pixels, the third column of sub-pixels and the fourth column of sub-pixels are turned on at time t1, and the first sub-processing unit 310 and the second sub-processing unit 320 respectively receive four electrical signal values at the same time, and sum the received four electrical signal values.

Through the above analysis, it can be seen that for two groups of different sub-pixels, signal values can be added and output by two independent sub-processing units, and different processing speeds can be achieved through different connection manners. When a plurality of sub-pixels in one group of sub-pixels are in one-to-one correspondence to a plurality of signal lines, the calculation processing speed at this time is the fastest and the number of signal lines is the greatest.

It should be understood that in the cases of the pixel arrangements of FIG. 6b to FIG. 6d, the connection manner of the sub-processing units to the sub-pixels may refer to the above various connection manners of FIG. 10a to FIG. 10c, and four sub-pixels of one group of sub-pixels may be connected to one signal line, two signal lines or four signal lines, respectively, which will not be repeated redundantly herein.

For another example, the N groups of sub-pixels include a first group of sub-pixels 210, a second group of sub-pixels 220, a third group of sub-pixels 230 and a fourth group of sub-pixels 240. Correspondingly, the processing unit 300 includes a first sub-processing unit 310, a second sub-processing unit 320, a third sub-processing unit 330 and a fourth sub-processing unit 340. The third sub-processing unit 330 is configured to sum third sub-pixels 231 in the third group of sub-pixels 230, and the fourth sub-processing unit 340 is configured to sum fourth sub-pixels 241 in the fourth group of sub-pixels 240.

Optionally, different connection manners may be used to connect the first sub-processing unit 310 to the plurality of first sub-pixels 211, the second sub-processing unit 320 to the plurality of second sub-pixels 221, the third sub-processing unit 330 to the plurality of third sub-pixels 231 and the fourth sub-processing unit 340 to the plurality of fourth sub-pixels 241. An image processor transfers data at different speed in different connection manners.

Different connection manners of the first sub-processing unit 310, the second sub-processing unit 320, the third sub-processing unit 330 and the fourth sub-processing unit 340 to sub-pixels in the arrangement of the sub-pixels of FIG. 7a will be exemplarily illustrated below with reference to FIG. 11a to FIG. 11b.

Figure 11A:
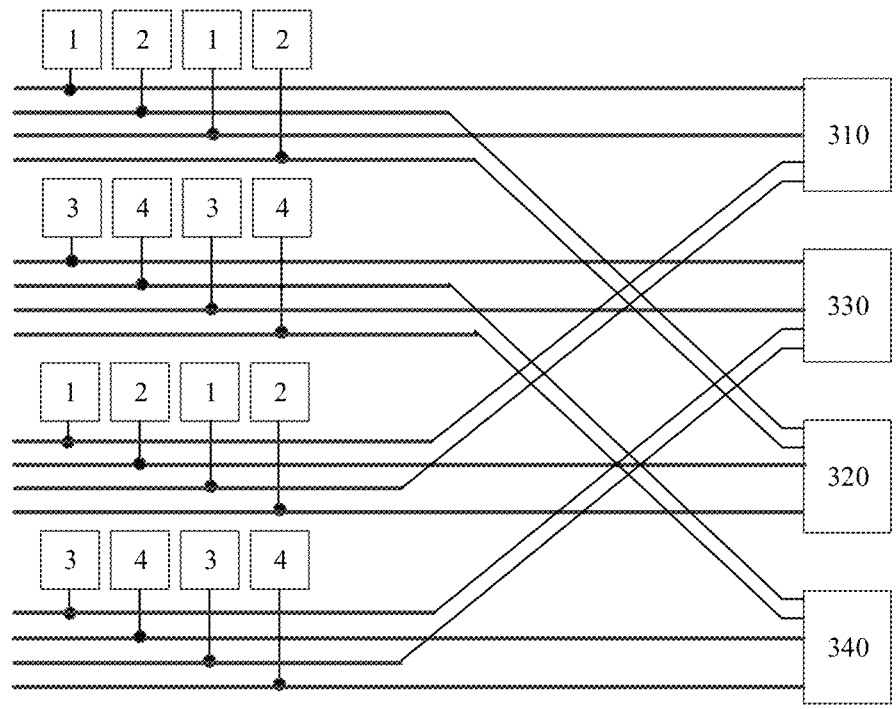
FIG. 11a to FIG. 11b are schematic diagrams of circuit connections of multiple pixel array circuits according to another embodiment of the present application.

Optionally, as shown in FIG. 11a, in a possible connection manner, each sub-pixel in four groups of sub-pixels is connected to an independent signal line, the first sub-processing unit 310, the second sub-processing unit 320, the third sub-processing unit 330 and the fourth sub-processing unit 340 are connected to their corresponding four sub-pixels in sequence through four signal lines. At time t1, the first column to fourth column of sub-pixels may be driven simultaneously, and the four sub-processing units respectively receive and sum signal values of the four sub-pixels.

It should be understood that the connection manner shown in FIG. 11a is applicable to any positional relationship and arrangement of four first sub-pixels, four second sub-pixels, four third sub-pixels and four fourth sub-pixel.

Figure 11B:
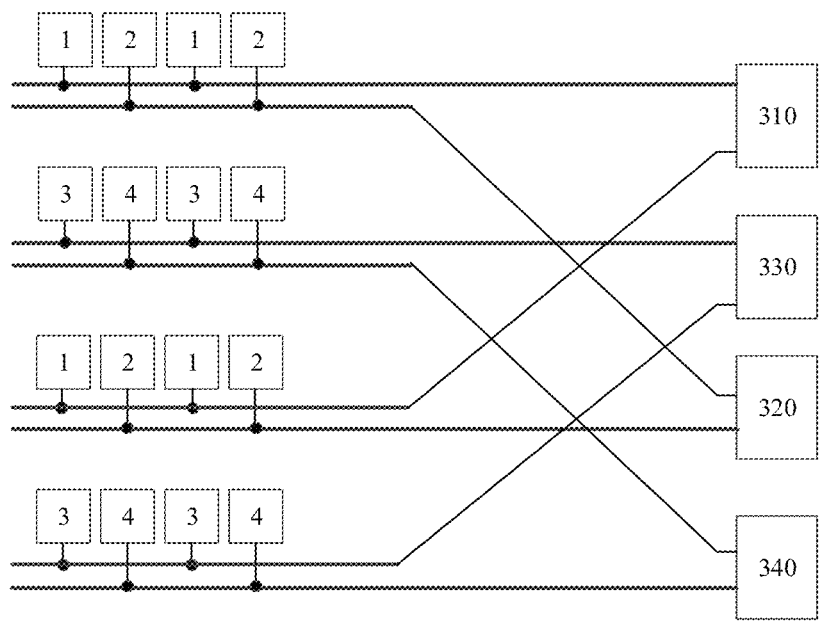

Optionally, as shown in FIG. 11b, four sub-pixels in each group of sub-pixels are connected to corresponding sub-processing units through two data links. At time t1, the first column of sub-pixels and the second column of sub-pixels are driven, and the four sub-processing units respectively receive signal values of two sub-pixels at the same time; at time t2, the third column of sub-pixels and the fourth column of sub-pixels are driven, and the four sub-processing units respectively receive signal values of the other two sub-pixels at the same time, and then sum the signal values of the four sub-pixels.

In comparison of the connection manners of FIG. 11b and FIG. 11a, the pixel signal collecting time of FIG. 11b is twice that of FIG. 11a, but the number of data signal lines of FIG. 11b is a half of that of FIG. 11a.

Optionally, four sub-pixels in each group of sub-pixels may be connected to a corresponding sub-processing unit through one signal line, and in this case, the signal collecting time of the sub-pixels is longer, but the number of data signal lines is the least.

Figure 12:
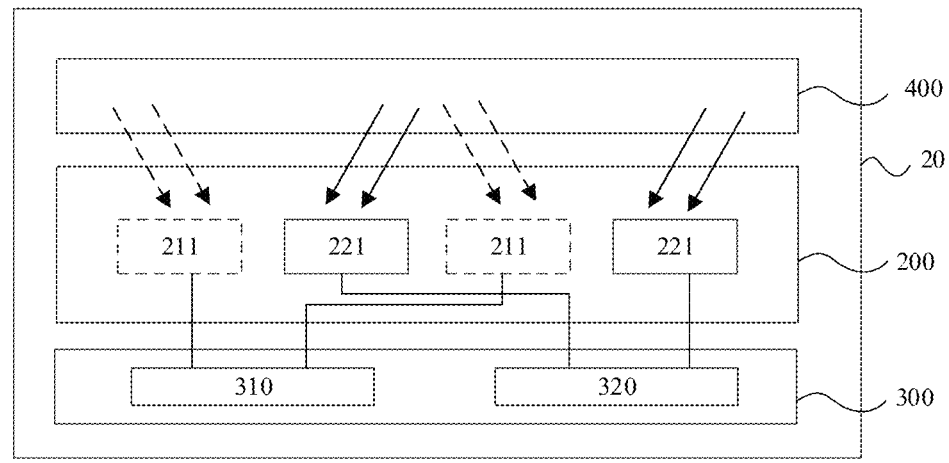
FIG. 12 is a schematic block diagram of a fingerprint detection apparatus according to an embodiment of the present application.

Optionally, as shown in FIG. 12, the fingerprint detection apparatus 20 may further include: an optical component 400; and the optional component 400 is configured to be passed through by light signals with different characteristics. For example, fingerprint light signals after reflection or refraction via the finger and then passing through the optical component may be fingerprint light signals in different directions when the optical component includes a micro-lens array and a light shielding layer.

Optionally, in a possible implementation manner, the optical component 400 includes a micro-lens array 410 and at least one light shielding layer 420.

The micro-lens array 410 is configured to be disposed under the display screen and includes a plurality of micro-lenses;

the at least one light shielding layer 420 is disposed under the micro-lens array 410 and provided with a plurality of light directing channels corresponding to each micro-lens of the plurality of micro-lenses; and an optical sensing pixel array includes the N groups of sub-pixels and is disposed under the at least one light shielding layer 420, and one sub-pixel is disposed under each of the plurality of light directing channels corresponding to the each micro-lens.

A plurality of sub-pixels are disposed under the each micro-lens, the plurality of sub-pixels disposed under the each micro-lens are respectively configured to receive light signals converged by adjacent micro-lenses and transmitted through corresponding light directing channels, and the light signals are used to detect fingerprint information of the finger.

Specifically, light directing channels corresponding to different groups of sub-pixels in the N groups of sub-pixels have different directions, and light directing channels corresponding to the same group of sub-pixels in the N groups of sub-pixels have the same direction. Further, light signals passing through light directing channels in the same direction have the same direction.

Figure 13:
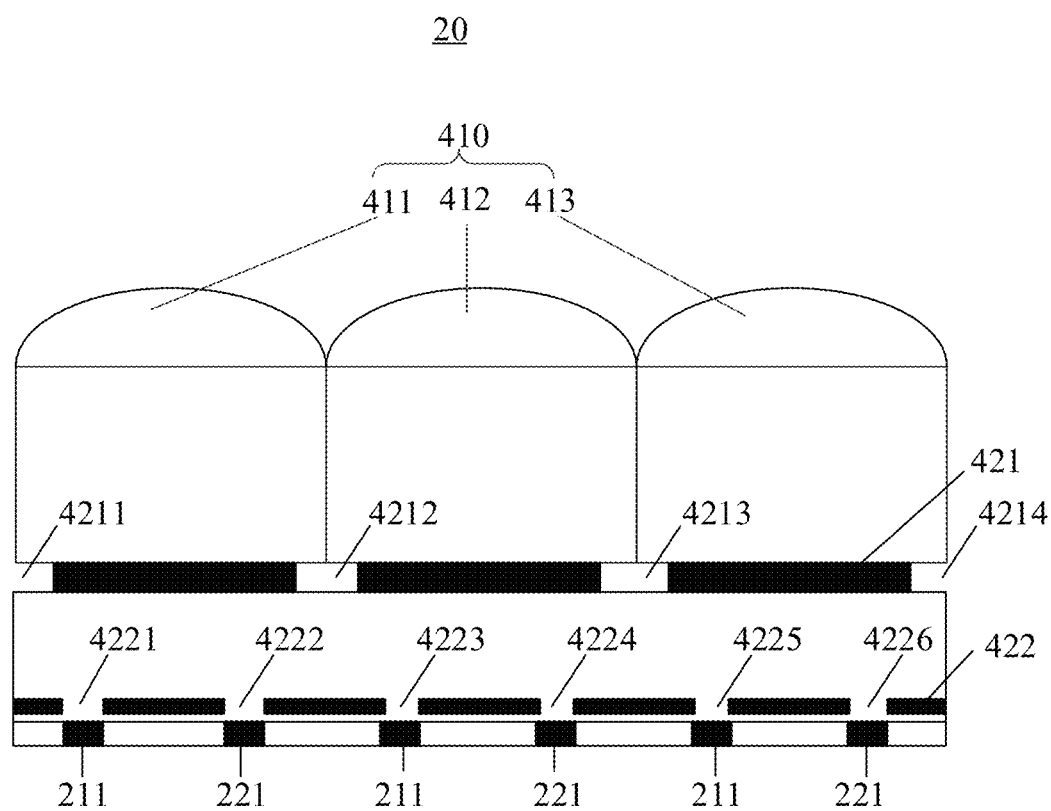
FIG. 13 is a schematic structural diagram of a fingerprint detection apparatus according to an embodiment of the present application.

For example, as shown in FIG. 13, the micro-lens array 410 may include a first micro-lens 411, a second micro-lens 412 and a third micro-lens 413. The at least one light shielding layer 420 may include a plurality of light shielding layers. For example, the at least one light shielding layer 420 may include a first light shielding layer 421 and a second light shielding layer 422. The N groups of sub-pixels include a first group of sub-pixels and a second group of sub-pixels, and a plurality of first sub-pixels 211 in the first group of sub-pixels and a plurality of second sub-pixels 221 in the second group of sub-pixels are disposed under the second light shielding layer 422.

The at least one light shielding layer 420 is provided with a plurality of light directing channels corresponding to each micro-lens in the micro-lens array 410, and bottoms of the plurality of light directing channels corresponding to the each micro-lens respectively extend under a plurality of adjacent micro-lenses.

As shown in FIG. 13, the first light shielding layer 421 and the second light shielding layer 422 are respectively provided with at least one opening corresponding to each micro-lens (that is, the first micro-lens 411, the second micro-lens 412 and the third micro-lens 413) of the plurality of micro-lenses. For example, the first light shielding layer 421 is provided with a first opening 4211 and a second opening 4212 corresponding to the first micro-lens 411, the first light shielding layer 421 is further provided with the second opening 4212 and a third opening 4213 corresponding to the second micro-lens 412, and the first light shielding layer 421 is provided with the third opening 4213 and a fourth opening 4214 corresponding to the third micro-lens 413. Similarly, the second light shielding layer 422 is provided with a fifth opening 4221 and a sixth opening 4222 corresponding to the first micro-lens 411, the second light shielding layer 422 is further provided with a seventh opening 4223 and an eighth opening 4224 corresponding to the second micro-lens 412, and the second light shielding layer 422 is provided with a ninth opening 4225 and a tenth opening 4226 corresponding to the third micro-lens 413.

In an example of the second micro-lens 412, a plurality of light directing channels corresponding to the second micro-lens 412 may include a light directing channel formed by the second opening 4212 and the sixth opening 4222 and a light directing channel formed by the third opening 4213 and the ninth opening 4225. The light directing channel formed by the second opening 4212 and the sixth opening 4222 extends under the first micro-lens 411, and the light directing channel formed by the third opening 4213 and the ninth opening 4225 extends under the third micro-lens 413.

Further, one sub-pixel is disposed under each of a plurality of light guiding channels corresponding to each micro-lens.

In an example of the second micro-lens 412, a second sub-pixel 221 is disposed under the light directing channel formed by the second opening 4212 and the sixth opening 4222, and a first sub-pixel 211 is disposed under the light directing channel formed by the third opening 4213 and the ninth opening 4225.

Furthermore, a plurality of sub-pixels are disposed under each micro-lens. The plurality of sub-pixels disposed under the each micro-lens are respectively configured to receive light signals converged by a plurality of adjacent micro-lenses and transmitted through corresponding light directing channels, and the light signals are used to detect fingerprint information of the finger.

In an example of the second micro-lens 412, one first sub-pixel 211 and one second sub-pixel 221 may be disposed under the second micro-lens 412, where the first sub-pixel 211 may be configured to receive a first oblique light signal converged by the first micro-lens 411 and transmitted through a light directing channel formed by the second opening 4212 and the seventh opening 4223, and the second sub-pixel 221 may be configured to receive a second oblique light signal converged by the third micro-lens 413 and transmitted through a light directing channel formed by the third opening 4213 and the eighth opening 4224. A direction of the first oblique light signal is different from that of the second oblique light signal.

Meanwhile, a light directing channel corresponding to each of the plurality of first sub-pixels 211 in the first group of sub-pixels 210 has the same direction, and a light directing channel corresponding to each of the plurality of second sub-pixels 221 in the second group of sub-pixels 220 has the same direction. Therefore, each first sub-pixel receives a first oblique light signal, and each second sub-pixel receives a second oblique light signal.

Optionally, in another possible implementation manner, the at least one light shielding layer 420 is disposed under the micro-lens array 410 and provided with one light directing channel corresponding to each micro-lens of the plurality of micro-lens; and the N groups of sub-pixels are disposed under the at least one light shielding layer 420, and one sub-pixel is disposed under the light directing channel corresponding to the each micro-lens;

where one sub-pixel is disposed under the each micro-lens, and the sub-pixel disposed under the each micro-lens is configured to receive a light signal converged by the micro-lens and transmitted through the corresponding light directing channel.

Specifically, light directing channels corresponding to different groups of sub-pixels in the N groups of sub-pixels have different directions, and light directing channels corresponding to the same group of sub-pixels in the N groups of sub-pixels have the same direction.

Figure 14:
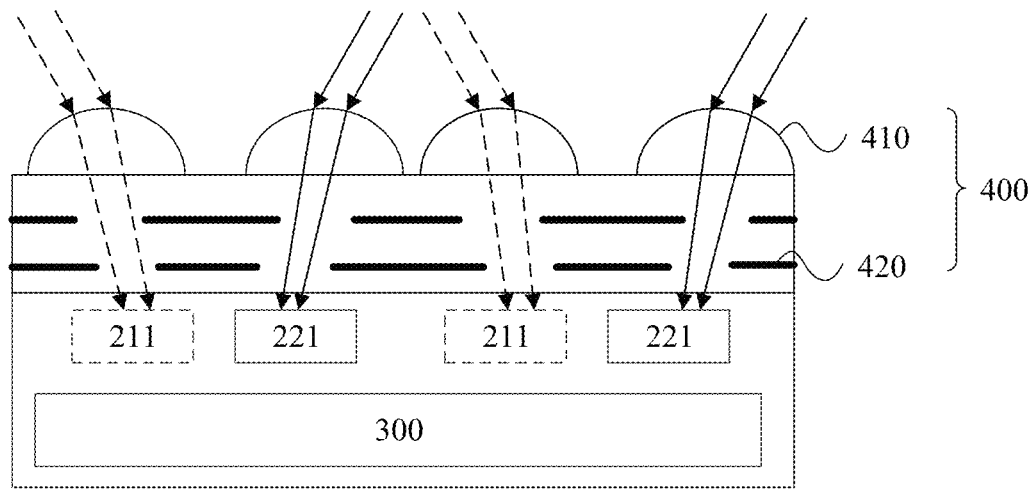
FIG. 14 is a schematic structural diagram of another fingerprint detection apparatus according to an embodiment of the present application.

For example, as shown in FIG. 14, each micro-lens in the micro-lens array 410 corresponds to one light directing channel, one sub-pixel is disposed under one light directing channel, and directions of light directing channels corresponding to the plurality of first sub-pixels 211 in the first group of sub-pixels 210 are different from directions of light directing channels corresponding to the plurality of second sub-pixels 221 in the second group of sub-pixels 220. Therefore, different light directing channels are passed through by light signals in different directions, and directions of first light signals received by the first group of sub-pixels are different from directions of second light signals received by the second sub-pixels. Similarly, a light directing channel corresponding to each of the plurality of first sub-pixels 211 in the first group of sub-pixels 210 has the same direction, and a light directing channel corresponding to each of the plurality of second sub-pixels 221 in the second group of sub-pixels 220 has the same direction. Each first sub-pixel receives a first light signal, and each second sub-pixel receives a second light signal.

Optionally, in another possible implementation manner, the at least one light shielding layer 420 is disposed under the micro-lens array 410 and provided with a plurality of light directing channels corresponding to each micro-lens of the plurality of micro-lens; and the N groups of sub-pixels are disposed under the at least one light shielding layer 420, and one sub-pixel is disposed under each of the plurality of light directing channels corresponding to the each micro-lens;

where a plurality of sub-pixels are disposed under the each micro-lens, and the plurality of sub-pixels disposed under the each micro-lens are respectively configured to receive light signals converged by the micro-lens and transmitted through corresponding light directing channels.

Figure 15:
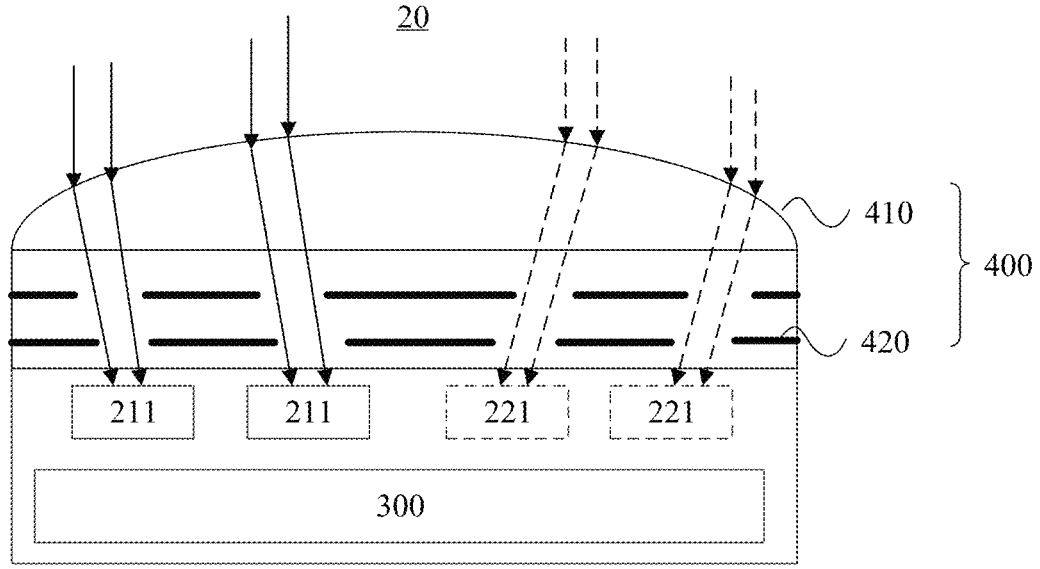
FIG. 15 is a schematic structural diagram of another fingerprint detection apparatus according to an embodiment of the present application.

For example, as shown in FIG. 15, each micro-lens in the micro-lens array 410 corresponds to a plurality of light directing channels, one sub-pixel is disposed under one light directing channel, the plurality of light directing channels are all located under the current micro-lens and do not extend under another micro-lens, for example, an adjacent micro-lens. Therefore, a plurality of sub-pixels are all located under the current micro-lens. Similarly, in the embodiment of the present application, directions of light directing channels corresponding to the plurality of first sub-pixels 211 are different from directions of light directing channels corresponding to the plurality of second sub-pixels 221, a light directing channel corresponding to each of the plurality of first sub-pixels 211 has the same direction, and a light directing channel corresponding to each of the plurality of second sub-pixels 221 has the same direction.

In the embodiment of the present application, based on the design of the optical component including the micro-lens array and the at least one light shielding layer, different groups of sub-pixels in the N groups of sub-pixels may be allowed to receive light signals in different directions and thus may generate multiple fingerprint images with directional characteristics for the light signals in various directions, and may further perform fusion processing on the multiple fingerprint images with directional characteristics at the same time to optimize them into one fingerprint image with high resolution, which improves imaging quality of the fingerprint sensor, and the fingerprint image with high resolution is used for fingerprint identification, which could improve the identification effect.

In addition, with the technical solution of the embodiment of the present application, a plurality of sub-pixel may be disposed under each micro-lens in the micro-lens array, so that the spatial period of the micro-lens array and the spatial period of the N groups of sub-pixels are not equal, thereby avoiding occurrence of Moire fringes in the fingerprint images and improving the fingerprint identification effect.

Moreover, by designing a plurality of light directing channels for each micro-lens, imaging light paths may be formed by a single micro-lens with the plurality of sub-pixels. That is, light signals at multiple angles may be multiplexed by a single micro-lens (for example, light signals at four angles may be multiplexed by a single micro-lens), and segmentation imaging may be performed on light beams at different object space aperture angles, which improves an amount of entering light of the fingerprint detection apparatus effectively, and thus reduces an exposure duration of time of the sub-pixel array.

Non-directly facing light imaging (that is, oblique light imaging) may be performed on object space light beams of the under-screen fingerprint by the imaging light paths formed by a single micro-lens with the plurality of sub-pixels, and specifically, the plurality of sub-pixels disposed under the each micro-lens are respectively configured to receive light signals converged by a plurality of adjacent micro-lenses, thereby enlarging an object square numerical aperture of the optical system, shortening a thickness of a light path design (that is, the at least one light shielding layer) of the sub-pixel array, finally reducing a thickness of the fingerprint detection apparatus effectively, and improving robustness of the system and tolerance of the fingerprint detection apparatus 20.

An embodiment of the present application further provides an electronic device, and the electronic device may include a display screen and the fingerprint detection apparatus according to the foregoing embodiments of the present application, where the fingerprint detection apparatus is disposed under the display screen to implement under-screen optical fingerprint detection.

The electronic device may be any electronic device having a display screen.

The display screen may use the display screen in the above description, such as an OLED display screen or other display screens. For a description of the display screen, reference may be made to illustration of the display screen in the above description, and for brevity, no further details are provided herein.

It should be understood that specific examples in the embodiments of the present application are just for helping those skilled in the art better understand the embodiments of the present application, rather than for limiting the scope of the embodiments of the present application.

It should be understood that terms used in the embodiments of the present application and the claims appended hereto are merely for the purpose of describing particular embodiments, and are not intended to limit the embodiments of the present application. For example, the use of a singular form of "a", "the above" and "said" in the embodiments of the present application and the claims appended hereto are also intended to include a plural form, unless otherwise clearly indicated herein by context.

In addition, various functional units in the embodiments of the present application may be integrated into a processing unit, or each unit may exist alone physically, or two or more than two units may be integrated into one unit.

The foregoing descriptions are merely specific embodiments of the present application. The protection scope of the present application, however, is not limited thereto. Various equivalent modifications or replacements may be readily conceivable to any person skilled in the art within the technical scope disclosed in the present application, and such modifications or replacements shall fall within the protection scope of the present application. Therefore, the protection scope of the present application shall be subject to the protection scope of the claims.

What is claimed is:

1. A fingerprint detection apparatus, wherein the fingerprint detection apparatus is applied under a display screen to implement under-screen optical fingerprint identification, and the apparatus comprises: a fingerprint sensor;
   the fingerprint sensor comprises: N groups of sub-pixels, wherein N is a positive integer greater than 1; and
   different groups of sub-pixels in the N groups of sub-pixels respectively receive light signals in different directions in light signals returned by reflection or scattering via a finger, and light signals in the same direction received by each group of sub-pixels in the N groups of sub-pixels are used to form one pixel in a fingerprint image of the finger;
   wherein the N groups of sub-pixels comprise a first group of sub-pixels, a plurality of first sub-pixels in the first group of sub-pixels are not adjacent to each other, and the plurality of first sub-pixels in the first group of sub-pixels are adjacent to other sub-pixels in the N groups of sub-pixels other than the first group of sub-pixels.

2. The fingerprint detection apparatus according to claim 1, wherein the fingerprint sensor comprises: M*N groups of sub-pixels, wherein M is a positive integer; and
   light signals received by the N groups of sub-pixels are used to form N fingerprint images of the finger, and each of the N fingerprint images of the finger has M pixels.

3. The fingerprint detection apparatus according to claim 2, wherein the N fingerprint images are superimposed to obtain one fingerprint image with high resolution for fingerprint identification.

4. The fingerprint detection apparatus according to claim 1, wherein each group of sub-pixels in the N groups of sub-pixels comprises a plurality of sub-pixels, and a sum of a plurality of light signals received by the plurality of sub-pixels is used to form one pixel in the fingerprint image of the finger.

5. The fingerprint detection apparatus according to claim 1, wherein each group of sub-pixels in the N groups of sub-pixels comprises one sub-pixel, and light signal received by the one sub-pixel is used to form one pixel in the fingerprint image of the finger.

6. The fingerprint detection apparatus according to claim 1, wherein the number of sub-pixels in each group of sub-pixels in the N groups of sub-pixels is equal.

7. The fingerprint detection apparatus according to claim 1, wherein the N groups of sub-pixels comprise a first group of sub-pixels, and a plurality of first sub-pixels in the first group of sub-pixels are adjacent to each other.

8. The fingerprint detection apparatus according to claim 1, wherein each group of sub-pixels in the N groups of sub-pixels is arranged in the same manner in the N groups of sub-pixels.

9. The fingerprint detection apparatus according to claim 1, wherein each sub-pixel in the N groups of sub-pixels has the same shape and size, and is arranged in an array.

10. The fingerprint detection apparatus according to claim 1, wherein N=4.

11. The fingerprint detection apparatus according to claim 10, the N groups of sub-pixels comprises a first group of sub-pixels, a second group of sub-pixels, a third group of sub-pixels and a fourth group of sub-pixels;
wherein the first group of sub-pixels comprises four first sub-pixels, the second group of sub-pixels comprises four second sub-pixels, the third group of sub-pixels comprises four third sub-pixels, and the fourth group of sub-pixels comprises four fourth sub-pixels;
the four first sub-pixels are not adjacent to each other, the four second sub-pixels are not adjacent to each other, the four third sub-pixels are not adjacent to each other and the four fourth sub-pixels are not adjacent to each other; and
a first sub-pixel, a second sub-pixel, a third sub-pixel, and a fourth sub-pixel are adjacent to each other.

12. The fingerprint detection apparatus according to claim 1, wherein each group of sub-pixels in the N groups of sub-pixels comprises K sub-pixels, wherein K is an integer greater than 1, and the fingerprint detection apparatus further comprises: a processing unit;
the K sub-pixels are configured to convert received light signals into K electrical signals; and
the processing unit is configured to sum the K electrical signals to obtain one pixel in the fingerprint image of the finger.

13. The fingerprint detection apparatus according to claim 12, wherein the processing unit comprises N sub-processing units, and one of the N sub-processing units is configured to sum one group of sub-pixels in the N groups of sub-pixels.

14. The fingerprint detection apparatus according to claim 12, wherein the processing unit comprises a first sub-processing unit, the N groups of sub-pixels comprise a first group of sub-pixels, and the first sub-processing unit is connected to K sub-pixels in the first group of sub-pixels through K signal lines.

15. The fingerprint detection apparatus according to claim 14, wherein the first sub-processing unit is configured to receive K first electrical signals of the K sub-pixels in the first group of sub-pixels at the same time, and perform a summing calculation on the K first electrical signals.

16. The fingerprint detection apparatus according to claim 1, wherein the fingerprint detection apparatus further comprises: an optical component, the optional component is configured to be passed through by light signals in different directions;
wherein the optional component comprises: a micro-lens array and at least one light shielding layer;
the micro-lens array is configured to be disposed under the display screen and comprises a plurality of micro-lenses;
the at least one light shielding layer is disposed under the micro-lens array and provided with a plurality of light directing channels corresponding to each micro-lens of the plurality of micro-lenses; and
the N groups of sub-pixels and is disposed under the at least one light shielding layer, and one sub-pixel is disposed under each of the plurality of light directing channels corresponding to the each micro-lens.

17. The fingerprint detection apparatus according to claim 16, light directing channels corresponding to different groups of sub-pixels in the N groups of sub-pixels have different directions, and light directing channels corresponding to the same group of sub-pixels in the N groups of sub-pixels have the same direction.

18. The fingerprint detection apparatus according to claim 16, the plurality of light directing channels corresponding to each micro-lens are all located under the current micro-lens and do not extend under an adjacent micro-lens, and a plurality of sub-pixels corresponding to the plurality of light directing channels are all located under the current micro-lens.

19. An electronic device, comprising:
a display screen and a fingerprint detection apparatus, wherein the fingerprint detection apparatus is disposed under the display screen, and the fingerprint detection apparatus comprises:
a fingerprint sensor;
the fingerprint sensor comprises: N groups of sub-pixels, wherein N is a positive integer greater than 1; and
different groups of sub-pixels in the N groups of sub-pixels respectively receive light signals in different directions in light signals returned by reflection or scattering via a finger, and light signals in the same direction received by each group of sub-pixels in the N groups of sub-pixels are used to form one pixel in a fingerprint image of the finger;
wherein the N groups of sub-pixels comprise a first group of sub-pixels, a plurality of first sub-pixels in the first group of sub-pixels are not adjacent to each other, and the plurality of first sub-pixels in the first group of sub-pixels are adjacent to other sub-pixels in the N groups of sub-pixels other than the first group of sub-pixels.

* * * * *